Oct. 18, 1955     G. H. PFEFFERLE ET AL     2,721,091
GASKET FOR PIPE COUPLINGS AND CLAMPS
Filed July 2, 1951
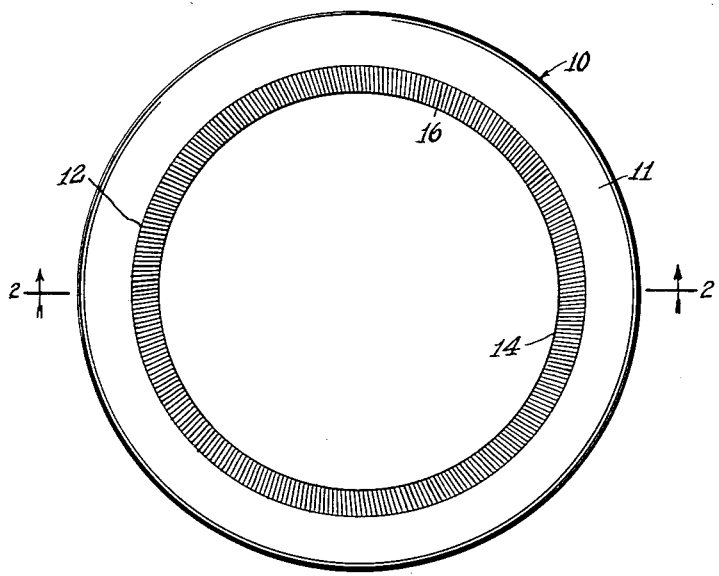
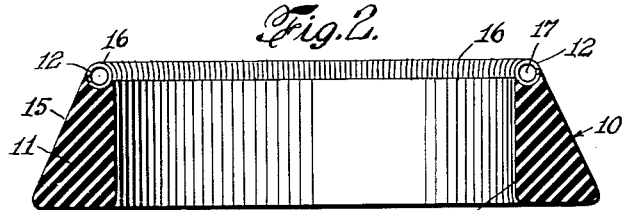
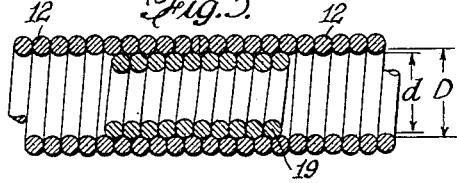
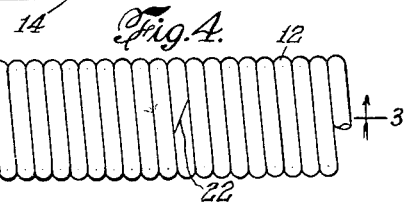
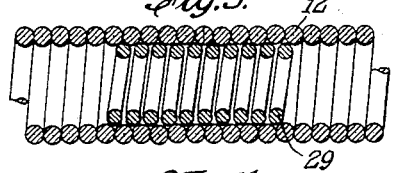
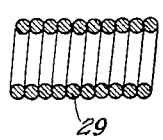
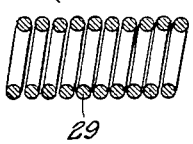
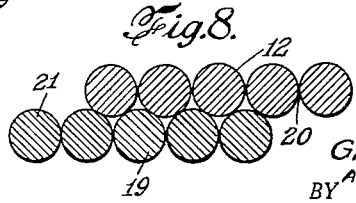
INVENTORS
GEORGE H. PFEFFERLE
AND ROBERT E. BURNS
BY
ATTORNEY.

United States Patent Office 2,721,091
Patented Oct. 18, 1955

2,721,091

GASKET FOR PIPE COUPLINGS AND CLAMPS

George H. Pfefferle, Dallas, Tex., and Robert E. Burns, Valley Stream, N. Y., assignors to Dresser Industries, Inc., Dallas, Tex., a corporation of Pennsylvania Application July 2, 1951, Serial No. 234,750

3 Claims. (Cl. 288—11)

The present invention relates to gaskets for pipe joints, couplings, clamps and similar devices and particularly to rubber gaskets having one or more metallic helices embedded therein. The term "rubber" is herein used in a broad sense to include not only natural rubber compounds but also synthetic compounds having similar physical properties. While the embedded helices are preferably metal, such as brass or stainless steel, they may be formed of other material having similar properties of strength and resilience. For convenience of terminology, they are referred to as being metallic helices, whether actually made of metal or of a substitute material.

In devices of this kind, it is extremely important to prevent the cold flow or extrusion of the rubber gasket material through clearances between adjacent metal surfaces, as, for example, between the pipe and a portion of a pipe clamp or coupling. It is also desirable in some instances to protect the gasket from deterioration due to the presence of gases or liquids within the pipe line that are injurious to rubber. For this purpose, one or more metal coils or helices are embedded in the rubber gasket, for example in a corner where two gasket surfaces intersect. The turns or convolutions of the helices are sufficiently close together to inhibit any appreciable flow of rubber between them or any appreciable chemical attack of the rubber by destructive substances occurring in a pipe line.

In a gasket comprising a continuous endless ring of rubber composition, a metallic helix embedded in the gasket is of annular or toroidal form. However, as a practical proposition, it is not feasible to make the metallic helices endless. The helix is therefore wound as a straight spring which is cut to the required length, bent into circular form and the ends joined together before the helix is molded into the rubber composition of the gasket.

In a gasket of this kind, it is important not to reduce the elasticity of the gasket materially and is particularly important to maintain the elasticity of the gasket uniform throughout its circumferential extent. Hence, any method of joining the ends of the metal helix which results in substantial local stiffening of the helix at the place where the ends are joined is undesirable and objectionable. It is an object of the present invention to overcome this objection and to provide an endless annular gasket of rubber composition in which there is embedded an annular helix having its ends joined in such manner that the flexibility of the helix and of the gasket is not materially reduced. It is a further object of the invention to provide a simple, inexpensive and effective method of joining the ends of the helix embedded in the rubber composition of the gasket.

The objects and advantages of the invention will be more fully understood from the following description of the embodiments which have been shown by way of example in the accompanying drawings, in which:

Fig. 1 is an end view of a gasket in accordance with the invention.

Fig. 2 is a diametrical axial section of the gasket taken approximately on the line 2—2 in Fig. 1.

Fig. 3 is an enlarged sectional view of a portion of the metal helix before it is embedded in the rubber, showing how the ends of the helix are joined together, the section being taken approximately on the line 3—3 in Fig. 4.

Fig. 4 is a fragmentary elevation on an enlarged scale showing a portion of the helix when the ends are joined together.

Fig. 5 is a sectional view similar to Fig. 3 but showing a modification.

Fig. 6 is a sectional view showing an element for joining the ends of the helix before it is placed in the helix.

Fig. 7 is a view similar to Fig. 6 but showing a modification.

Fig. 8 is a schematic view representing a magnification of a portion of Fig. 3.

In Figs. 1 and 2, there is shown an endless annular gasket 10 comprising a body portion 11 formed as an endless ring of rubber composition and an annular helix 12 embedded in the rubber composition. The particular gasket shown by way of example in the drawing has a substantially plane surface 13, a cylindrical surface 14 and a conical surface 15. The annular helix 12 is located in the intersection between the cylindrical surface 14 and the conical surface 15 of the gasket. The annular helix may be completely enclosed in the rubber or, alternatively, a portion of the helix, indicated at 16, may be substantially bare. In some instances, the rubber compound fills the space 17 inside of the helix while in other instances it does not. Successive convolutions of the helix are substantially in contact with one another, any space between them being sufficiently small as to prevent any material flow of the rubber between the turns of the helix.

The helix 12 is preferably wound of a round wire of resilient material such as brass or stainless steel that is not attacked by the material to be carried in the pipe line on which the gasket is used. The diameter of the wire is preferably 15% to 25% of the outside diameter of the coils of the helix. The following table gives examples of typical coil and wire sizes:

| Outside Diameter of the Coil, inches | Wire Diameter, inches |
|---|---|
| .0625 | .0124 |
| .125 | .0253 |
| .1875 | .0403 |
| .25 | .0508 |
| .312 | .0571 |
| .375 | .0571 |

While the helix 12 is of annular or toroidal form in the completed gasket, it is made initially as a straight spring, for example by winding a wire around a suitable mandrel. Alternatively, the helix may be formed in other ways, for example by extrusion. After the helix has been formed as a straight spring, a length corresponding to the circumferential extent of the gasket is cut off and the two ends are joined together in the manner illustrated in Figs. 3 to 5.

Referring first to Fig. 3, it will be seen that the ends of the helix 12 are joined together by means of a short length of an inner helix 19 which fits frictionally into the end portions of the outer helix 12. Although successive convolutions of the outer helix 12 are substantially in contact with one another, the wire from which the helix is wound is of such cross-section, preferably round as shown in the drawings, as to form an inner helical groove 20 (Fig. 8) between successive convolutions of the wire. The inner helix 19 is similarly wound of wire of such cross-section—preferably round—as to provide a helical rib or projection 21 on the outside of the inner helix. As seen from Fig. 3, the outside diameter D of the inner helix 19 is slightly greater than the inside diameter $d$ of the outer helix 12 so that the helical rib or projecting portion 21 on the outside of the inner helix fits into the helical groove 20 on the inside of the outer helix 12. The convolutions of the inner helix thus interlock with the convolutions of the outer helix and hold the ends of the outer helix securely together. When the helices are wound of round wire, as shown in the drawings, the outside diameter of the inner helix exceeds the inside diameter of the outer helix by an amount approximately 5 to 15% of the diameter of the wire from which the outer helix is wound. Preferably, the convolutions of the inner helix 19 have an outside diameter D that exceeds the inside diameter $d$ of the outer helix by an amount approximately 25% of the difference between the diameter of the wire of the outer helix and the radius of the wire from which the inner helix is formed. This assures firm frictional engagement and secure interlocking of the two helices.

The two ends 22 of the wire forming the outer helix 12 abut one another and are preferably cut off at an angle, as shown in Fig. 4. These ends are held in abutment and alignment with one another by the inner helix 19 in such manner that close examination of the completed annular helix is required to find where the ends are joined.

The outer helix 12 and the inner helix 19 are both formed of resilient wire, as, for example, brass. Since the flexibility of the inner helix 19 is approximately the same as that of the outer helix 12, the flexibility of the completed annular helix is substantially the same at the point where the two ends are joined as elsewhere in the helix. In fact, the flexibility and resilience of the completed annular helix is so uniform that it is difficult to determine by bending it where the junction between the two ends is formed.

In the embodiment illustrated in Fig. 3, the outer helix 12 and inner helix 19 are both wound from wire having substantially the same diameter. The helices are hence substantially of the same pitch, i. e. they have the same number of turns per unit length.

In Fig. 5, there is shown a modification in which the inner helix 29 is formed of wire having a somewhat smaller diameter than that of which the outer helix 12 is wound. In its normal unstressed condition (Fig. 6), i. e. before it is inserted in the outer helix 12, the inner helix 29 has a lower pitch, so that the turns of the helix measured center to center are closer together than are those of the outer helix 12. In other words, the inner helix 29 in its normal unstressed condition has more turns per unit length than the outer helix 12. When the inner helix 29 is inserted in the outer helix 12 (Fig. 5), the turns of the inner helix are sprung apart by reason of the greater pitch of the outer helix. Hence, in the assembled condition, the turns of the inner helix 29 are under spring tension. This has the effect of increasing the frictional engagement of the inner helix with the outer helix toward one another. Because of the smaller diameter of the wire from which the inner helix is formed, the turns of the inner helix will fit further into the grooves between the turns of the outer helix. Thus, if the inside diameter of the outer helix remains the same, the outside diameter of the inner helix, when wound of smaller wire as in Fig. 5, can be slightly greater than it is when wound of the same size wire as the outer helix, as shown in Fig. 3.

Fig. 7 illustrates a modification of the construction shown in Figs. 5 and 6 and shows the inner helix 29 wound with its turns slightly spaced so as to have the same pitch as the outer helix, even though the inner helix is wound of smaller diameter wire. Thus, the construction shown in Fig. 7 does not have the spring friction feature described above in connection with Figs. 5 and 6 but has slightly greater flexibility.

In assembling the inner and outer helices to join the ends of the outer helix together, the end portions of the outer helix can be forced axially over the inner helix, this being permitted by the resilient construction. Preferably, however, the inner helix is screwed half-way into one end of the outer helix. The other end of the outer helix is screwed onto the protruding end of the inner helix, being first rotated in a reverse direction so that the elasticity of the outer helix tends to screw the ends of the outer helix toward one another on the inner helix, thereby keeping the ends of the outer helix in tight abutment.

It has been found that a novel characteristic of the construction in accordance with the invention is that, as the inner helix is screwed into the outer helix, there is progressively increasing resistance to turning so that turning becomes difficult when the section of inner helix is half-way in. This effect is important because it makes the inner helix self-centering in a lengthwise direction with respect to the joint. The phenomenon is similar to the way a nipple with a tapered pipe thread becomes progressively tighter as it is screwed into the end of a pipe or fitting but it is achieved without tapering of the inner or outer helix. One explanation of this effect is that, while the inner helix has the same pitch as the outer helix, it has a different helix angle (Figs. 3 and 5), so that there is progressively increasing elastic deformation and frictional resistance as the inner helix is screwed into the outer helix. This characteristic appears also to be a factor in providing a desirable self-locking property resisting the unscrewing of the inner and outer helices. In the form of the invention shown in Figs. 5 and 6, the self-centering as well as the self-locking features are augmented by the progressive elastic separation of the convolutions of the inner helix as it is screwed into the outer helix.

While the invention has been illustrated by way of example in the drawings, it is in no way limited to the specific embodiments that have been shown but may be modified within the scope of the appended claims.

What we claim and desire to secure by Letters Patent is:

1. In a gasket for pipe joints comprising a continuous endless ring of rubber composition, an outer resilient helix wound of wire with successive convolutions substantially touching one another and with a helical groove formed on the inside of the helix between successive convolutions of the wire, said helix being embedded in the rubber composition of the ring and extending around the ring with its ends substantially abutting one another to form an annular helix, the improvement comprising a separate inner resilient helix wound of wire of smaller diameter than that of the outer helix with a helical groove between successive convolutions and fitting inside both end portions of the outer helix, the convolutions of the inner helix having an outside diameter slightly greater than the inside diameter of the outer helix and fitting frictionally into the helical groove formed between the convolutions of the outer helix which in turn fit into the helical groove between convolutions of the inner helix, portions of said rubber composition embracing said end portions of the outer helix to confine said end portions and hold the convolutions of said end portions of the outer helix in said helical groove between the convolutions of the inner helix to provide a mechanical interlock between the inner and outer helices and a resilient connection between the ends of the outer helix.

2. In a gasket according to claim 1, the further improvement that, in normal unstressed condition, i. e. prior to assembly of the two helices, the successive turns of the inner helix are closer together than the turns of the outer helix in the sense of there being more turns per unit of length, the turns of the inner helix being resiliently spread apart by engagement with the turns of the outer helix when the helices are assembled.

3. In a gasket for pipe joints comprising a continuous endless ring of resilient rubber composition, an outer resilient helix wound of wire of round cross section with successive convolutions substantially touching one another and with a shallow helical groove formed on the inside of the helix between successive convolutions of the wire, said helix being embedded in the rubber composition of the ring and extending around the ring with its ends abutting one another to form an annular helix, the improvement comprising a separate inner resilient helix of smaller diameter wound of round wire with a shallow helical groove between successive convolutions and fitting inside both of the abutting end portions of the outer helix without expansion of said end portions, said inner helix being of uniform diameter throughout its length and the convolutions of the inner helix having a uniform outside diameter only slightly greater than the inside diameter of the outer helix and entering said helical groove between the convolutions of the outer helix, which in turn enter the helical groove between convolutions of the inner helix, portions of said rubber composition embracing said end portions of the outer helix to hold the convolutions of said end portions resiliently in engagement with the inner helix and thereby provide a positive, yet resilient connection between the ends of the outer helix.

References Cited in the file of this patent

UNITED STATES PATENTS

| | | |
|---|---|---|
| 266,529 | Root | Oct. 24, 1882 |
| 809,880 | Woolldridge et al. | Jan. 9, 1906 |
| 1,847,378 | Browning | Mar. 1, 1932 |
| 1,984,806 | Pfefferle | Dec. 18, 1934 |
| 2,001,835 | Cook | May 21, 1935 |